United States Patent [19]

Shaanan et al.

[11] Patent Number: 4,947,424
[45] Date of Patent: Aug. 7, 1990

[54] SHUTTER MECHANISM FOR TELEPHONE DIRECTORY

[75] Inventors: Gad J. Shaanan, Westmount; George V. Lenaerts, London; Ian D. Buchanan, London; Anthony M. Smith, London, all of Canada

[73] Assignee: Northern Telecom Limited, Montreal, Canada

[21] Appl. No.: 424,032

[22] Filed: Oct. 19, 1989

[51] Int. Cl.⁵ .......................................... H04M 1/274
[52] U.S. Cl. ..................................... 379/355; 379/440
[58] Field of Search ............... 379/354, 355, 356, 357, 379/359, 440; 40/371, 336, 337

[56] References Cited

U.S. PATENT DOCUMENTS

Re. 31,649  8/1984  Brodbeck .
4,277,651  7/1981  Fisher et al. ....................... 379/355
4,409,440  10/1983  Brodbeck .

OTHER PUBLICATIONS

Texas Instruments Collagiate Guidebook, 1987, pp. 1-6, 1-7, 1-9.

Primary Examiner—Jin F. Ng
Assistant Examiner—Jhancy Angustus
Attorney, Agent, or Firm—John E. Mowle

[57] ABSTRACT

A shutter mechanism for a telephone directory that stores telephone numbers to be dialed. The directory has physical spaces for the entry of descriptive labels (e.g. names). The shutter mechanism has a first planar surface for providing these physical spaces. It has a second planar surface overlying the first surface. The second surface is divided into alternating opaque and transparent sections such that the surface having the names can be moved underneath the second surface such that the names can be hidden by the opaque sections or revealed by the transparent sections.

8 Claims, 5 Drawing Sheets

SHUTTER MECHANISM FOR TELEPHONE DIRECTORY

FIELD OF THE INVENTION

This invention relates generally to electro-mechanical directories or indices for telephone numbers and more particularly to a shutter mechanism for use with such directories.

BACKGROUND OF THE INVENTION

Many telephone sets store frequently dialled numbers in a memory internal to the telephone set. When one wishes to dial a stored number one can access the number by pressing a key on the telephone set to indicate that a stored number is to be accessed and dialled. One then pushes a numeric button to indicate the number desired to be dialled For example, if a telephone can store ten telephone numbers, one might push the "1" button to dial the telephone number stored at position "1". If the "2" button were pushed, the telephone number stored at position "2" would be dialled, etc. This, of course, has the disadvantage that one must remember what number is stored at the various positions; and it also involves the use of several button pushes. Once one gets above a capacity of ten numbers, two number buttons (e.g. "1" and "5"), in addition to the "memory" button, must be pushed to initiate a telephone call.

Some telephone sets add to the above-mentioned telephone set, a list of numbers, so that they are readily available to the user for instant recall. Some do this by a simple list on the face of the telephone. This, of course, results in a loss of privacy.

More elaborate mechanisms are also used. U.S. Pat. No. 4,409,440 dated Oct. 11, 1983 by R. M. Brodbeck teaches a standalone telephone index and switch arrangement. This patent describes a relatively complex mechanism to store a relatively large number of telephone numbers.

U.S. Pat. Re. No. 31,649 dated Aug. 21, 1984 by R. M. Brodbeck also describes a relatively complex mechanism to store telephone numbers.

SUMMARY OF THE INVENTION

The present invention is directed to a relatively simple mechanism that, when used with an electro-mechanical telephone directory, provides a space for labels for the buttons that are to be actuated, and provides a privacy shutter mechanism to hide the labels when desired. In one preferred embodiment, the buttons associated with the labels are locked out when the labels are hidden.

Stated in other terms, the present invention is a shutter mechanism for a telephone directory that stores telephone numbers to be dialled by the push of a single button, the directory comprising a plurality of such buttons, each button of the plurality of buttons having a physical space associated therewith for entry of a descriptive label, the shutter mechanism comprising:

a first, approximately planar, surface for providing the physical space for the descriptive labels;

a second, approximately planar, surface overlying the first surface, in a plane approximately parallel to the first surface and spaced apart therefrom;

the second surface being divided into a plurality of alternating opaque and transparent sections such that when the first surface is in a first position, relative to the second surface, the physical spaces are aligned with the transparent sections of the second surface, and when the first surface is in a second position, relative to the second surface, the physical spaces are aligned with the opaque sections of the second surface, and the contents of the physical spaces are not visible.

BRIEF DESCRIPTION OF THE DRAWINGS

The present invention will now be described in more detail with reference to the accompanying drawings, wherein like parts in each of the several figures are identified by the same reference character, and wherein.

DETAILED DESCRIPTION

Figure 1:
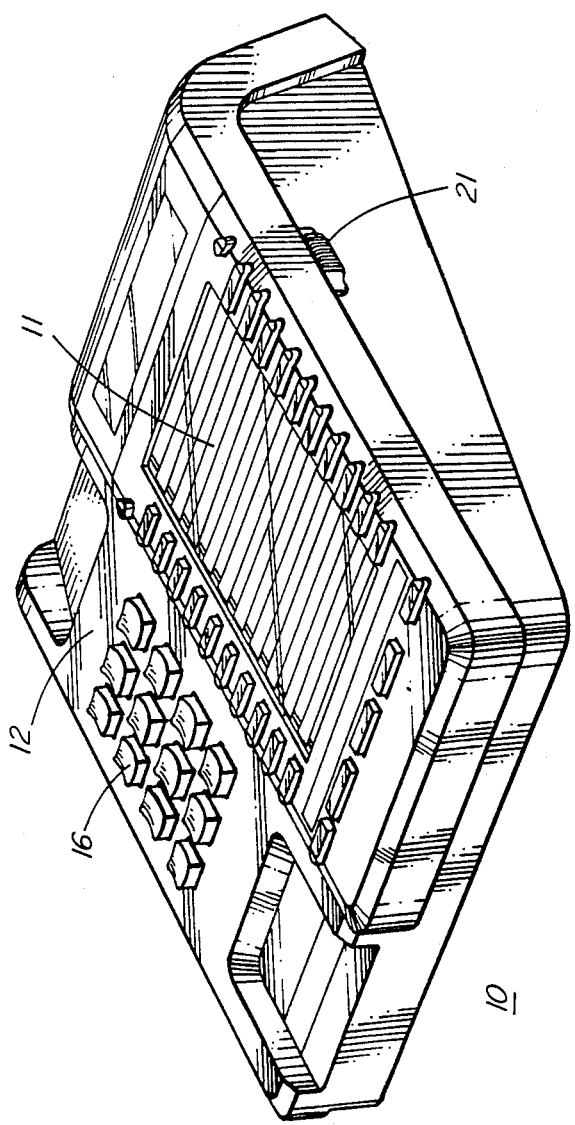
FIG. 1 is a perspective view of a telephone set base incorporating the present invention.

FIG. 1 is a perspective view of a telephone set base 10 incorporating the shutter mechanism 11 of the present invention. Also depicted is a faceplate 12, a numeric keypad 16 as well as other buttons and devices not relevant to this discussion.

Figure 2:
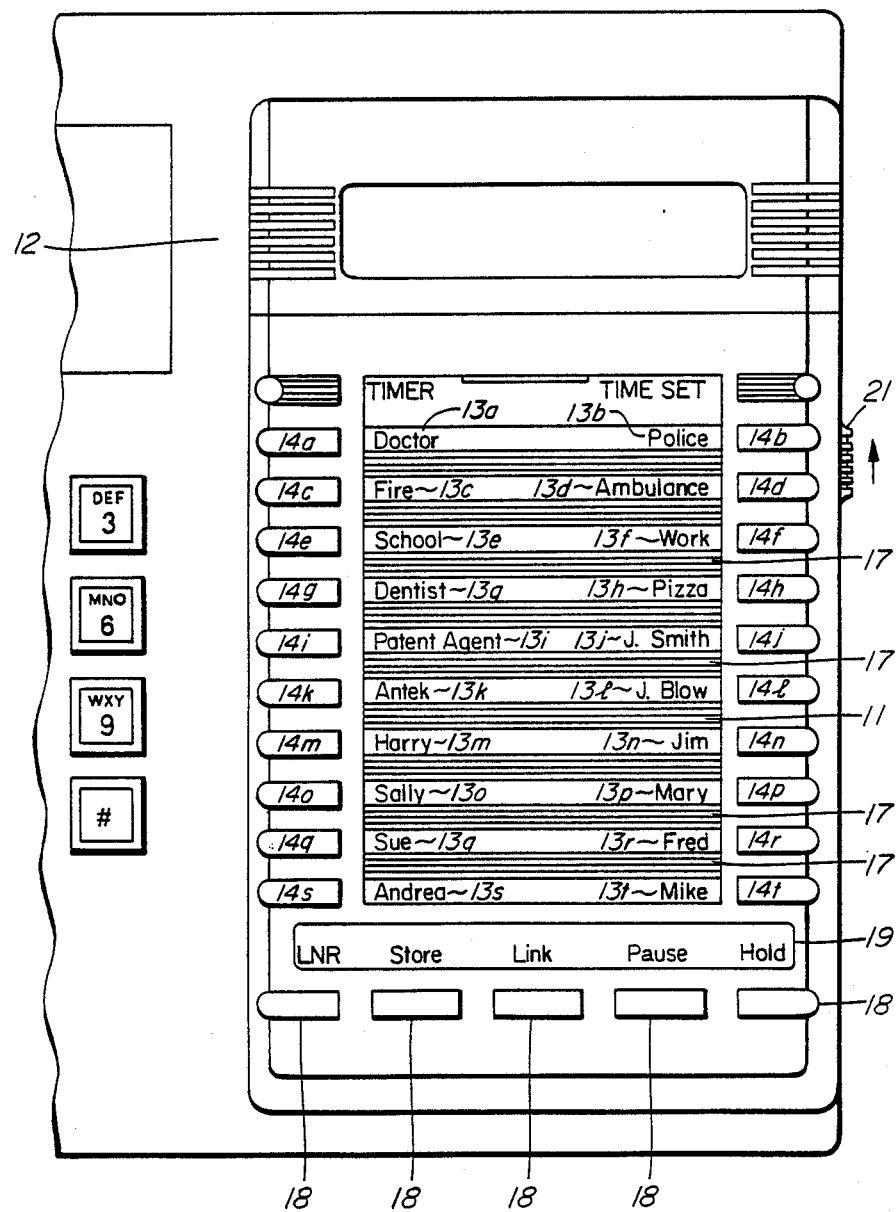
FIG. 2 is a partial plan view of the faceplate of the telephone set base of FIG. 1 showing the present invention in a first state.

FIG. 2 is a partial plan view of faceplate 12 of telephone set base 10 of FIG. 1, showing shutter mechanism 11 in more detail, and in a first state.

In FIG. 2, shutter mechanism 11 is in a first state in which the names 13a–13t (e.g. "Doctor", "Police", "Fire", etc.) are visible; note that the names 13a–13t are referred to collectively as names 13. Associated with each name 13 is a corresponding button 14; note that these are buttons 14a to 14t, referred to collectively as buttons 14.

To call (or dial) the "Doctor", as indicated by name 13a, one presses button 14a and the telephone number for "Doctor" (which is stored in memory, not shown, and not necessary for an understanding of this invention) is automatically dialled. In a similar fashion, if button 14b is pressed, then the telephone number stored for the name 13b "Police" is automatically dialled. Similar operations occur for the buttons 14c to 14t.

Note that the names 13 are grouped together in groups of two (e.g. 13a and 13b are together on a single line). Note also that each group of names 13 is separated from the next group of names 13 by an opaque space 17 of equal size and shape to that occupied by the group of names 13. The relevance of these opaque spaces 17 will become apparent later.

Shown below shutter mechanism 11 are several buttons 18 as well as display area 19, not relevant to the present invention.

Figure 3:
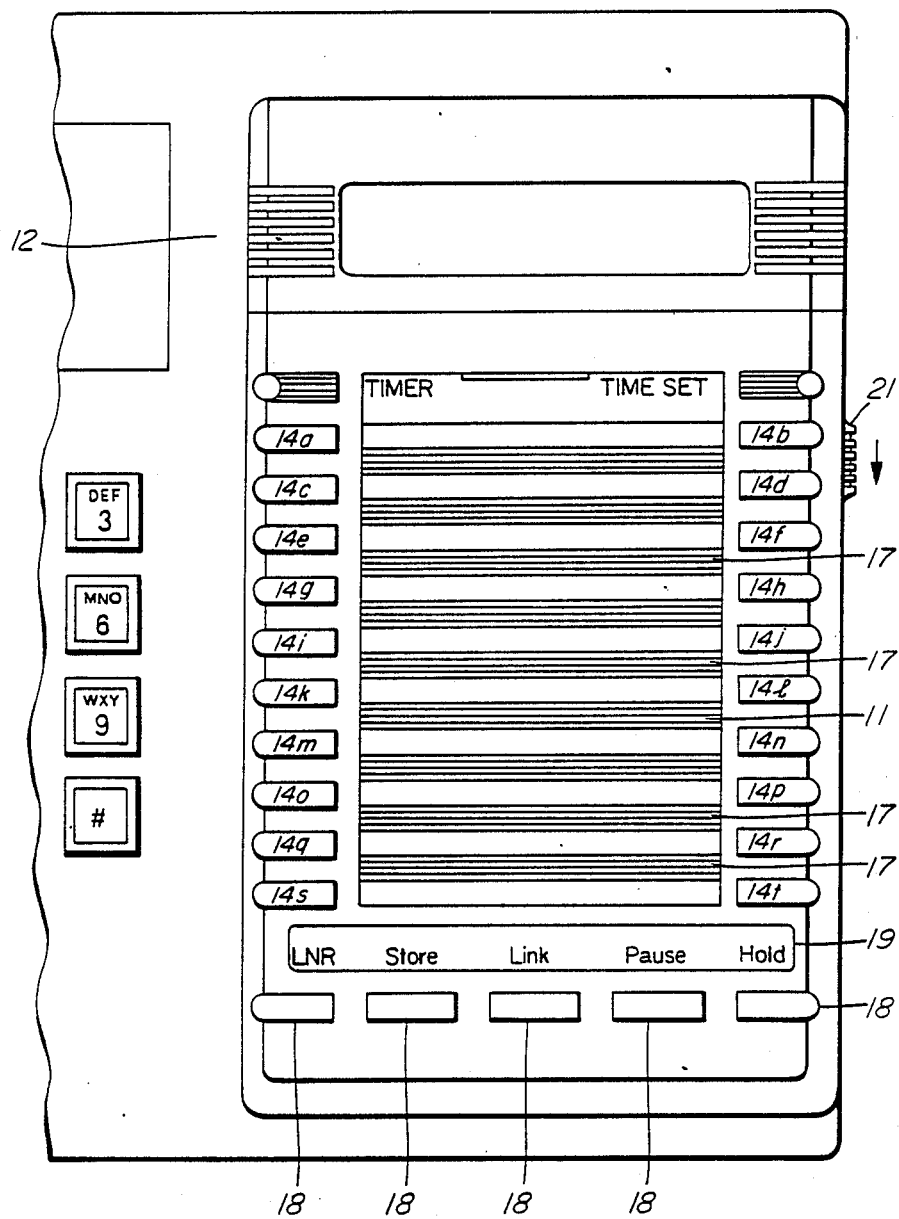
FIG. 3 is similar to FIG. 2 but depicts the present invention in a second state.

FIG. 3 depicts shutter mechanism 11 in its second state. As can be seen from FIG. 3, no names 13 are visible. In this second state, shutter mechanism 11 provides privacy in that the names 13 are hidden from the view of a casual observer. Also, when shutter mechanism 11 is in this second state, an interlock switch 36 (see FIG. 6) prevents the operation of the buttons 14. So even if a button 14 should be pressed by accident, it will not cause the dialling of a telephone number whilst the shutter mechanism 11 is in its second state.

Shutter mechanism 11 is moved between its first and second states by the operation of slide button 21 (with a throw of approximately 9.5 mm.). When slide button 21 is pushed down in FIG. 3 (i.e. in the direction indicated by the arrow next to button 21 in FIG. 3) shutter mechanism 11 is moved into its second state and the names 13 are not visible. When slide button 21 is pushed up in FIG. 2 (i.e. in the direction indicated by the arrow next to button 21 in FIG. 2) shutter mechanism 11 is moved into its first state and the names 13 are visible and the buttons 14 are operational.

Figure 4:
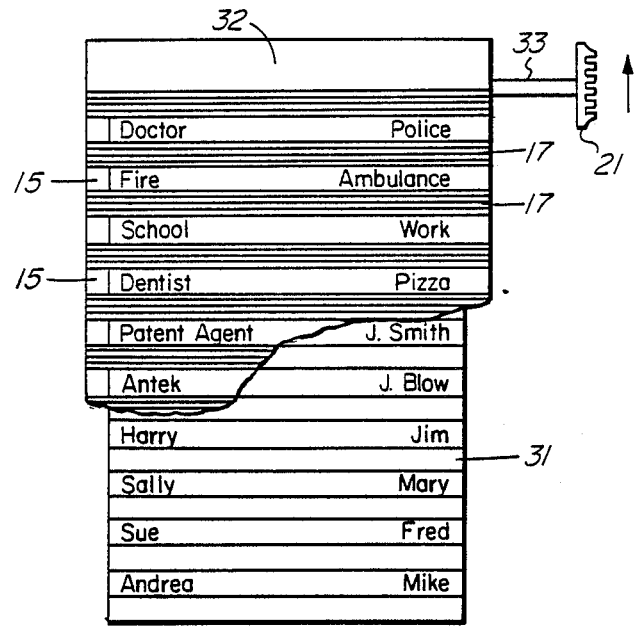
FIG. 4 is a simplified version of FIG. 2.

FIG. 4 is a simplified version of FIG. 2 to depict more clearly the action of shutter mechanism 11. In FIG. 4 the only items depicted are card 31, which carries the names 13, sheet 32 (shown partly cut away) which carries opaque spaces 17 separated by transparent spaces 15, and slide button 21 together with its interconnecting bar 33. Note that sheet 32 remains stationary and card 31 moves relative to sheet 32. Card 31 moves in response to slide button 21 being moved.

As depicted in FIG. 4, shutter mechanism 11 is in its first state and slide button 21 has been moved in the direction of the arrow next to it as far as it can go. In this position, the names 13 are visible through the transparent spaces 15 of sheet 32. Note that the distance between the centre of a transparent space 15 and the centre of an adjacent opaque space 17 is approximately 9.5 mm. Note also that the distance between adjacent spaces on card 31 is also approximately 9.5 mm. and, as depicted in FIG. 4, names are placed on only every other space on card 31.

Figure 5:
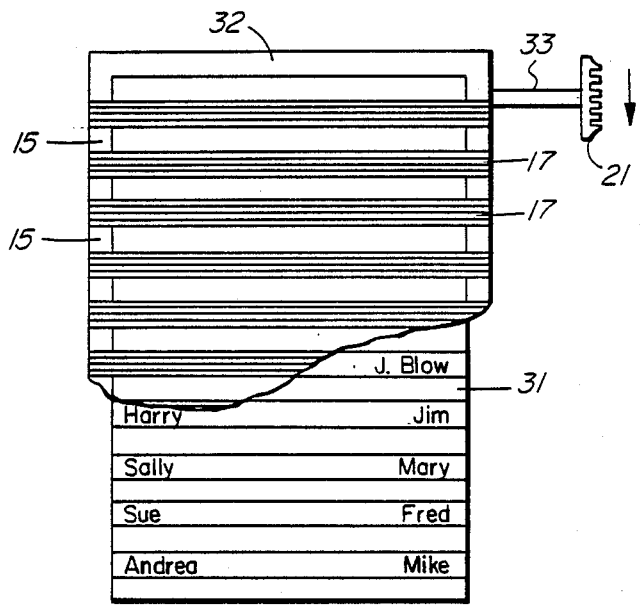
FIG. 5 is a simplified version of FIG. 3.

FIG. 5 is similar to FIG. 4, but depicts shutter mechanism 11 in its second state, whereby the names 13 are hidden by the opaque spaces 17 of sheet 32. To get to the second state, slide button 21 is pushed in the direction shown by the arrow next to button 21 in FIG. 5. This causes interconnecting bar 33 to move card 31, also in the direction of the arrow (next to button 21 in FIG. 5) such that the names 13 are moved underneath the opaque spaces 17 of sheet 32 and are thus no longer visible.

Figure 6:
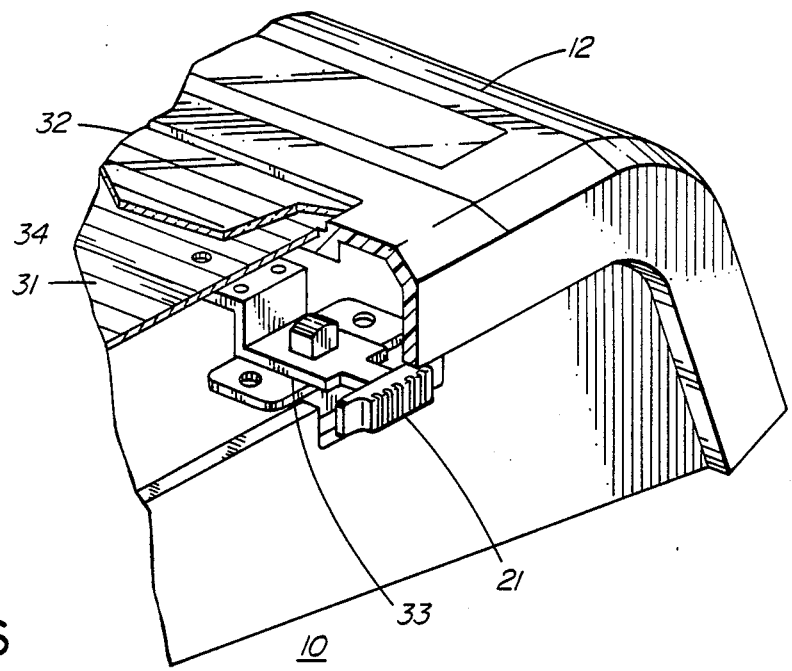
FIG. 6 is a partial cut away view of the telephone set base of FIG. 1 showing more detail on the operation of the present invention.

FIG. 6 is a partial cut away view of telephone set 10 (from FIG. 1) depicting the linkage between slide button 21, interconnecting bar 33, and card 31 in more detail. Bar 33 is formed to the shape shown from plastic. One end of bar 33 is attached to button 21 and the other end of bar 33 is attached to card 31 at location 34. As a result, card 31 moves in a direction parallel to the action of slide button 21. Sheet 32 is held fixed by telephone faceplate 12.

Figure 8:
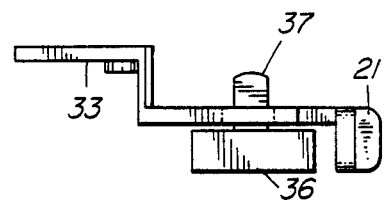
FIG. 8 is a side view of the switch of FIG. 7 showing its connections to its actuator.

As can be seen from FIGS. 6 and 8, in addition to moving card 31, bar 33 engages handle 37 of slide switch 36. This has the result that when button 21 is moved between its two extreme positions, switch 36 is turned on or off.

When shutter mechanism 11 is in its first state (as shown in FIG. 2), switch 36 is "on" and the buttons 14 are operational. When shutter mechanism 11 is in its second state (as shown in FIG. 3), switch 36 is "off" and the buttons 14 are non-operational. In the "off" state, switch 36 controls conventional gate circuitry (not shown) which inhibits power to the aforementioned memory containing the stored telephone numbers. Thus, operation of switch 36 serves two purposes. It ensures that telephone numbers are not dialled if the buttons 14 are accidentally pushed when shutter mechanism 11 is in its second state. Additionally, switch 36 provides a "detent" function for the button 21 and shutter mechanism 11.

Figure 7:
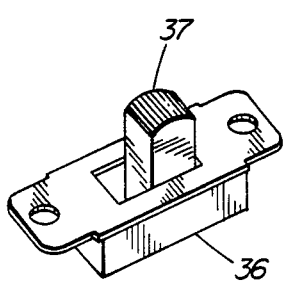
FIG. 7 is a perspective view of a switch used with the invention.

Note that switch 36 is a model No. SSFLA 1220045 manufactured by Shiang Inng Electronics Corporation of Taiwan. Switch 36 is a single pole, single throw slide switch shown in more detail in FIG. 7.

Figure 9:
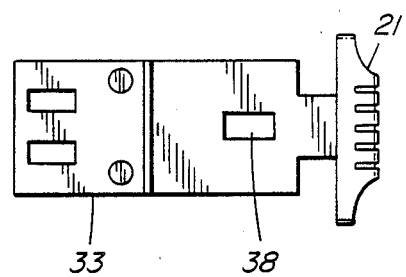
FIG. 9 is a top plan view of the actuator of FIG. 8.

FIG. 8 is a side view of button 21, bar 33, and switch 36 showing their interconnection in more detail. FIG. 9 is a top plan view of button 21 and bar 33 depicting hole 38 into which handle 37 of switch 36 mates.

What is claimed is:

1. A shutter mechanism for a telephone directory that stores telephone numbers to be dialled by the push of a single button, said directory comprising a plurality of such buttons, each button of said plurality of buttons having a physical space associated therewith for entry of a descriptive label, said shutter mechanism comprising:

a first, approximately planar, surface for providing said physical space for said descriptive labels;

a second, approximately planar, surface overlying said first surface, in a plane approximately parallel to said first surface and spaced apart therefrom;

said second surface being divided into a plurality of alternating opaque and transparent sections such that when said first surface is in a first position, relative to said second surface, said physical spaces are aligned with the transparent sections of said second surface, and when said first surface is in a second position, relative to said second surface, said physical spaces are aligned with the opaque sections of said second surface, and the contents of said physical spaces are not visible.

2. The shutter mechanism of claim 1 wherein said shutter mechanism is incorporated in the base of a telephone set.

3. The shutter mechanism of claim 1 or 2 wherein an interlock is included in said shutter mechanism such that when said first surface is in said second position, not only are the contents of said physical spaces not visible, but the buttons associated with said spaces are inoperative.

4. The shutter mechanism of claim 1 or 2 wherein said opaque and transparent sections are each of approximately equal size and shape.

5. The shutter mechanism of claim 1 or 2 wherein said physical spaces are each of approximately equal size and shape and wherein each said physical space is separated from another physical space by an area of similar size and shape to that of said physical space.

6. The shutter mechanism of claim 1 or 2 wherein said physical spaces are each of approximately equal size and shape and wherein each group of physical spaces is separated from another group of physical spaces by an area of similar size and shape to that of said group of physical spaces.

7. A shutter mechanism for a telephone directory that stores telephone numbers to be dialled by the push of a single button, said directory comprising a plurality of such buttons, each button of said plurality of buttons having a physical space associated therewith for entry of a descriptive label, said shutter mechanism comprising:

a first, approximately planar, surface for providing said physical space for said descriptive labels;

a second, approximately planar, surface overlying said first surface, in a plane approximately parallel to said first surface and spaced apart therefrom;

said second surface being divided into a plurality of alternating opaque and transparent sections such that when said first surface is in a first position, said physical spaces are aligned with the transparent sections of said second surface, and when said first surface is in a second position, said physical spaces are aligned with the opaque sections of said second surface, and the contents of said physical spaces are not visible;

said physical spaces are each of approximately equal size and shape and each group of physical spaces is separated from another group of physical spaces by an area of similar size and shape to that of said group of physical spaces; and an interlock means such that when said first surface is in said second position, the buttons associated with said physical spaces are inoperative.

8. The shutter mechanism of claim 7 wherein said interlock means is a single-pole, single-throw switch.

* * * * *